United States Patent Office 3,535,254
Patented Oct. 20, 1970

3,535,254
SINTERINGS OF POLYTETRAFLUOROETHYLENE RESINS CHARGED WITH SILICON MONOXIDE AND THE PREPARATION THEREOF
Giuseppe Zuliani and Armando Sacco, Merano, Bolzano, Italy, assignors to Montecatini Edison S.p.A., Milan, Italy, a corporation of Italy
No Drawing. Filed Jan. 24, 1968, Ser. No. 700,015
Claims priority, application Italy, Jan. 27, 1967, 11,957/67
Int. Cl. C08f *45/06;* C10m *7/14*
U.S. Cl. 260—41     3 Claims

ABSTRACT OF THE DISCLOSURE

Described are sinterings of polytetrafluoroethylene resins charged with silicon monoxide, which are useful for the construction of self-lubricating mechanical elements such as piston rings.

Also described is the preparation of sinterings of polytetrafluoroethylene resins charged with silicon monoxide. This process is characterized by the following steps:

Preliminary mixing of the polytetrafluoroethylene resin powder, having a granulometric size between $0.25\mu$ and $600\mu$, and silicon monoxide powder with a granulometric size between $50\mu$ and $200\mu$, in a ratio varying from 10–20% by weight of silicon monoxide with respect to polytetrafluoroethylene. Preforming the mixture by compression in suitable molds at a pressure between 1000 and 2500 kg./cm.² Sintering the compacted mixture by slowly heating in an oven, to a temperature between 330° and 360° C. for from 1 to 3 hours. And gradually cooling down the sintering to room temperature while still in the mold to avoid deformations and cracks.

---

The present invention concerns sinterings of polytetrafluoroethylene resins charged with silicon monoxide in various granulometric sizes and percentages and the preparation thereof.

It is quite known that some technological requirements impose an absolute absence of even traces of lubricating oil in the gases treated; for instance in the food and pharmaceutical industries, in plants for the treatment of water, in factories for electronic equipment. There is a growing use of gas compressors which are fitted with cylinders lacking any type of lubrication. These are known in machinery design as non-lubricated compressors.

In the processing for the preparation of lined textiles or papers, obtained by coupling textile bands to paper, such as in the paper coating or textile impregnation operations, machines are used called "spreading machines." These are characterized by a series of numerous rolls carrying, at considerable speed, the paper of textiles to be impregnated or coupled together. The rollers are driven by metal gears which cause considerable noise. The rollers are also subject to considerable vibrations which cause unevenly vibrated surfaces. In these applications, replacement of the metal gears by noiseless materials has been attempted. These materials by their nature do not allow high speeds, however, thus reducing the operational speed while, simultaneously, increasing maintenance costs because of their rapid wear.

In the big molding machines or in the oil-operated controls, the old conventional plait packings or molded gaskets were graually replaced by machined packings which ensure a much tighter seal because of their dimensional stability, thereby eliminating oil leakages even at the highest pressures and under the severest and prolonged operational conditions.

We have found that in all such cases it is possible to considerably improve the mechanical resistance to deformation, the resistance to wear, and to increase the hardness of the polytetrafluoroethylene resin from which can be obtained the most varied machine elements suited for the above-mentioned applications, by just adding to the polytetrafluoroethylene filling materials which are unalterable under the sintering process to which the above resin must be subjected.

The particular characteristics of resistance to abrasion and wear are considerably enhanced by the introduction and intimate mixing, according to our invention, of preestablished quantities of silicon monoxide into the starting charges of polytetrafluoroethylene resin, which are subsequently sintered. Thus these sinterings differ from those loaded with graphite, glass or ceramic substances, thereby meeting requisites substantially different from those of manufactured articles with metal fillers (copper, titanium, bronze).

The polytetrafluoroethylene powders are in granular form with granulometry of about $600\mu$ for the type generally used for general purposes, of about $300\mu$ for the type intended for machine elements and finally of $0.25\mu$ for the type used in extrusion molding. There is, furthermore, the possibilitly of reusing powders in different granulometric sizes, obtained from crushed manufactured objects.

The silicon monoxide (40–50%) presents itself as an amorphous, voluminous powder which begins to decompose above 400° C. The powder with granulometry below $200\mu$ possesses an apparent density between 0.4 and 0.7 and an apparent volume varying between 0.71 and 0.93 in relation to its transition from the flaky type to the crystalline type. The percentage of silicon monoxide charge in the resin is variable. Satisfactory results have been obtained with quantities of 10–20% by weight with respect to polytetrafluoroethylene. These percentages confer to the sintered product a typically compact and homogeneous aspect.

The workability of the sintering, obtained according to this invention, on a machine tool is excellent and permits obtaining by machining or milling elements with characteristics of dimensional tolerances equivalent to the tolerances obtained on metal pieces.

The transformation of the powders according to this invention, whatever the method used, whether by molding or by extrusion with a heated press, occurs according to a three-stage operational cycle: preforming, sintering and cooling.

In the first preforming step, the granular powder is subjected to a pre-established reduction of volume in suitable metal molds or dies, the degree of reduction varying in relation to the piece to be obtained. On the molds a pressure is exerted that varies from 1000 to 2500 kg./cm.² for powders loaded with silicon monoxide.

By the successive sintering operation, the formation of the bonds between the adjacent surfaces of the particles constituting the resin is achieved. The sintering is actually obtained by gradual heating in an oven of the preformed material until a temperature of 330°–360° C. is attained, which is maintained for from 1 to 3 hours depending on the thickness of the item being treated.

The cooling constitutes the final operation of the transformation cycle and is of considerable importance because variations in the density of the material, as well as its compactness with the elimination of cracks and deformations, depend upon its speed.

In particular the process according to the invention is characterized by the following operational stages:

(a) Preliminary mixing of the powders of polytetrafluoroethylene with a granulometry between $0.25\mu$ and $600\mu$ and silicon monoxide with a granulometry between $50\mu$ and $200\mu$ with 10–20% by weight of silicon monoxide with respect to polytetrafluoroethylene;

(b) Preforming of the mixture at room temperature in compression molds under a pressure varying from 1000 to 2500 kg./cm.$^2$;

(c) Sintering of the mixture pressed in the compression mold, at temperatures between 330 and 360° C. for a duration of from 1 to 3 hours;

(d) Gradual cooling down of the sintered mixture, still in the compression mold, for a period of not less than 12 hours, until reaching room temperature, and subsequent gradual relieving of the pressure.

In the following is given an illustrative and not limiting example.

EXAMPLE 1 kg. of polytetrafluoroethylene resin in powder form, having a granulometric size of 600μ was mixed in a rotating mixer at room temperature with 0.15 kg. of silicon monoxide having a granulometric size of 150μ. Thereupon from the mixture were molded cylinders having diameter of 80 mm. and a height of 40 mm., under a pressure of 1500 kg./cm.$^2$. The pressing while enclosed in the mold and under pressure was then subjected to a sintering operation for 1 hour at a temperature of 360° C. The pressing was then left to slowly cool down for a period of not less than 12 hours. At the end of this period the pressure was gradually relieved. The sintering thus obtained was then machined on a machine tool.

The product obtained is characterized by an abrasion and wear resistance that is considerably greater than that of the sinterings obtained according to the known technique. The hardness of the sinterings was between 4 and 4.5 kg./cm.$^2$. This hardness (Brinell) is referred to a sphere of 10 mm. diameter, charged with 150 kg., time 30 seconds.

The sinterings of polytetrafluoroethylene resin loaded with silicon monoxide, according to this invention, find an application in the production of pistons for nonlubricated compressors. They show a much greater resistance to deformation and wear than the sinterings loaded with glass or ceramic. The piston rings are, as a rule, made with a square cross section, with either a straight cut or an oblique cut. The piston rings are suitable for being placed on multi-ring pistons and each fitted into a corresponding groove in the piston, with the cut areas staggered with respect to each other so as to allow to reach higher pressures. The operational temperature, with respect to the additional charge, may exceed 250° C., but for continuous operation should be within 160–200° C. Of course, the life of the piston rings depends on the average speed of the piston, which should not exceed 5 m./sec.

The silicon monoxide loaded polytetrafluoroethylene resin may also be used in the manufacture of piston rings for vacuum pumps and for guide bands for pistons. In some applications wherein the piston, either because of the length of the stroke or because of the particular guiding system, is not centered, to ensure a correct working of the sealing piston rings, one provides the piston with one or more guiding rings. In this application, characterized mainly by a greater width of the rings, the sintering obtained according to the invention also turns out to be particularly suited because of its high resistance to abrasion.

Furthermore, one can replace metal gears with noiseless gear pairs, thus eliminating annoying noise and considerable vibrations, by using the sintering according to the invention to produce gears of mixed gear pairs (resin/metal) for high operational speeds and a high production, and accordingly reducing the wear experienced with conventional metal gear pairs.

Still further, machined packings from our sinterings can be used for hydraulic cylinders, replacing all plait packings and collar gaskets molded from different elastomers. As a matter of fact, in conventional elastomeric packings a rapid wear occurs due to the increase of friction, overheating and deformations with a consequent poor pressure tightness. The gaskets or packings obtained through the machining on a machine tool of the sinterings obtained according to this invention, ensure a much better adherence and a more precise profile together with a much lower tendency to deform than that to which polytetrafluoroethylene resin is prone.

We claim:

1. A process for the preparation of sinterings of polytetrafluoroethylene resins charged with silicon monoxide, which comprises:
   (a) preliminary mixing of polytetrafluoroethylene having a granulometric size between 0.25μ and 600μ with silicon monoxide powder having a granulometric size between 50μ and 200μ, with 10 to 20% by weight of silicon monoxide, with respect to polytetrafluoroethylene;
   (b) preforming the mixture at room temperature in compression molds at a pressure between 1000 and 2500 kg./cm.$^2$;
   (c) sintering the pressed mixture in a mold under pressure, at a temperature between 330° and 360° C. for from 1 to 3 hours; and
   (d) gradually cooling down the sintered mixture, while still in the compression mold, for at least 12 hours, to room temperature and subsequently gradually relieving the pressure.

2. The process of claim 1, wherein the powders recovered from manufactured objects obtained from said sinterings are reused.

3. Sinterings obtained according to the process of claim 1 comprising polytetrafluoroethylene charged with 10–20% by weight of silicon monoxide.

References Cited

UNITED STATES PATENTS

| | | | |
|---|---|---|---|
| 2,807,600 | 9/1957 | Newton | 260—41 |
| 2,959,563 | 11/1960 | Haehn | 260—41 |
| 3,080,258 | 3/1963 | Davis | 260—92.1 |
| 3,122,505 | 2/1964 | Rulon-Miller | 252—12 |
| 3,453,208 | 7/1969 | Gallagher | 252—12 |

MORRIS LIEBMAN, Primary Examiner

P. R. MICHL, Assistant Examiner

U.S. Cl. X.R.

252—12; 264—127